(12) United States Patent
Miwa et al.

(10) Patent No.: US 7,417,406 B2
(45) Date of Patent: Aug. 26, 2008

(54) ELECTRONIC APPARATUS THAT DETERMINES A CHARACTERISTIC OF A BATTERY

(75) Inventors: Takahiro Miwa, Kounan (JP); Yusuke Ota, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 193 days.

(21) Appl. No.: 10/922,930

(22) Filed: Aug. 23, 2004

(65) Prior Publication Data
US 2005/0057220 A1   Mar. 17, 2005

(30) Foreign Application Priority Data

Sep. 16, 2003  (JP) .............................. 2003-322893
Mar. 2, 2004   (JP) .............................. 2004-057538

(51) Int. Cl.
*H02J 7/16* (2006.01)
(52) U.S. Cl. .................... 320/151; 320/156; 324/434
(58) Field of Classification Search ................. 320/151, 320/156; 324/434
See application file for complete search history.

(56) References Cited

U.S. PATENT DOCUMENTS

| | | | |
|---|---|---|---|
| 4,316,185 A * | 2/1982 | Watrous et al. ........ | 340/636.11 |
| 4,849,682 A * | 7/1989 | Bauer et al. .................. | 320/106 |
| 6,020,743 A | 2/2000 | Reeves et al. | |
| 6,043,625 A * | 3/2000 | Dowe .......................... | 320/106 |
| 6,963,186 B2 * | 11/2005 | Hobbs ......................... | 320/128 |

FOREIGN PATENT DOCUMENTS

| | | |
|---|---|---|
| DE | 19611544 A1 * | 10/1996 |
| DE | 296 23 955 U1 | 1/2001 |
| JP | 10-38932 | 2/1998 |
| JP | A 11-260425 | 9/1999 |

* cited by examiner

*Primary Examiner*—Adolf Berhane
*Assistant Examiner*—Aaron Piggush
(74) *Attorney, Agent, or Firm*—Oliff & Berridge, PLC

(57) ABSTRACT

An electronic apparatus which detects when a battery having a different characteristic is mixed in a plurality of batteries accommodated therein. An average voltage V1 per battery of plural batteries connected in series and an average voltage V2 per battery at a connecting point halfway of those connected batteries are detected. A difference in voltage |V1−V2| between the average voltage V1 and average voltage V2 is compared with a tolerable voltage difference ΔV. If it is determined that a battery having a different characteristic is mixed, the operation of the apparatus is interrupted and an alarm is displayed or the supply of power is shut down.

35 Claims, 21 Drawing Sheets

FIG. 8

| BATTERY TYPE | ELECTROMOTIVE FORCE E[V] | INTERNAL RESISTANCE r [Ω] |
|---|---|---|
| ALKALINE BATTERY | 1.5 | 0.4 |
| MANGANESE BATTERY | 1.5 | 1.2 |
| Ni-MH BATTERY | 1.2 | 0.2 |

FIG. 14

| | Ia | 0.1A | 1.0A |
|---|---|---|---|
| Va[V] | | 8.68 | 5.8 |
| $V_1(=\frac{1}{6}Va)$[V] | | 1.45 | 0.97 |
| Vb[V] | | 4.3 | 2.5 |
| $V_2(=\frac{1}{3}Vb)$[V] | | 1.43 | 0.83 |

FIG. 17

| | Ib | 0.1A | 1.0A |
|---|---|---|---|
| $Vc[V]$ | | 8.48 | 6.5 |
| $V_1(=\frac{1}{6}Vc)[V]$ | | 1.41 | 1.08 |
| $Vd[V]$ | | 4.1 | 3.2 |
| $V_2(=\frac{1}{3}Vd)[V]$ | | 1.37 | 1.07 |

US 7,417,406 B2

ELECTRONIC APPARATUS THAT DETERMINES A CHARACTERISTIC OF A BATTERY

This application claims priority from JP 2003-322893 filed Sep. 16, 2003, and JP 2004-57538 filed Mar. 2, 2004, the disclosures of which are incorporated in their entireties herein by reference thereto.

BACKGROUND OF THE INVENTION

1. Field of Invention

The invention relates to an electronic apparatus which is powered by a plurality of batteries connected in series and more particularly to an electronic apparatus which prevents different types of batteries from being mixed by determining the characteristic of each battery to ensure safe usage thereof.

2. Description of Related Art

Japanese Patent Application Laid-Open No. HEI11-260425 (see pp. 3, 4 and FIGS. 2, 3) discloses an apparatus for detecting an inverse battery connection to insure a positive electrode and a negative electrode of each battery is mounted in a proper direction. In the apparatus, a plurality of batteries accommodated in an accommodating container are divided into a plurality of blocks for connection in series. A synthetic voltage of each block is detected to compare voltages in order to detect whether any battery is connected inversely. If an inversely connected battery is found, the supply of electric power is stopped to avoid overheating caused by the inverse connection of the battery, leakage of chemical fluid, or other related problems.

SUMMARY OF THE INVENTION

Although the conventional inverse battery connection detecting apparatus discussed above is capable of detecting an inversely connected battery in and among a plurality of batteries connected in series, the conventional inverse battery connection detecting apparatus is incapable of detecting a battery having a different characteristic, namely, a battery whose nominal voltage, type, or the like, is different (for example, manganese battery and alkaline battery) from the remaining plurality of batteries, or a battery whose remaining capacity is different (for example, unused battery and consumed battery) from the remaining plurality of batteries connected in series.

Thus, even if a battery having a different characteristic is mixed, the conventional apparatus is incapable of detecting its existence and the battery continues to be used. As a result, the apparatus may function improperly. Additionally, battery life may be shortened because when the discharge characteristics of respective batteries are different, an excessive usage condition may occur, thereby leading to leakage of fluid from the battery due to excessive discharge, or the like. Further, deterioration of the battery is accelerated.

Accordingly, the invention resolves the above-described problems and provides an electronic apparatus which is powered by a plurality of batteries connected in series. If a battery having a different characteristic is present, the apparatus detects its existence and stops the apparatus from operating, to prevent a leakage of fluid from the battery, abnormal operation of the apparatus and the like, thereby ensuring safe usage of the apparatus.

To achieve the above described object, according to an aspect of the invention, there is provided an electronic apparatus which is supplied with electric power from a plurality of batteries connected in series, comprising: a detecting device for detecting a first voltage of all of the batteries connected in series and for detecting a second voltage of the batteries connected in series at any connecting point; and a determining device for determining the battery characteristic based on the first voltage and the second voltage.

If a battery having a different characteristic, in terms of its nominal voltage, type, remaining capacity, and the like, is mixed in batteries connected in series, this aspect of the invention enables the detection of its existence by comparing the first voltage with the second voltage.

BRIEF DESCRIPTION OF THE DRAWINGS

The objects, features and advantages of the invention will become more apparent from reading the following description of exemplary embodiments taken in connection with the accompanying drawings in which:

FIG. 8 is a diagram showing an example of electromotive force and internal resistance of each of various kinds of batteries;

FIG. 14 is a diagram showing each voltage value when an alkaline battery and a manganese battery are mixed;

FIG. 17 is a diagram showing each voltage value when an alkaline battery and a Ni-MH battery are mixed.

DETAILED DESCRIPTION OF PREFERRED EMBODIMENTS

Figure 1:
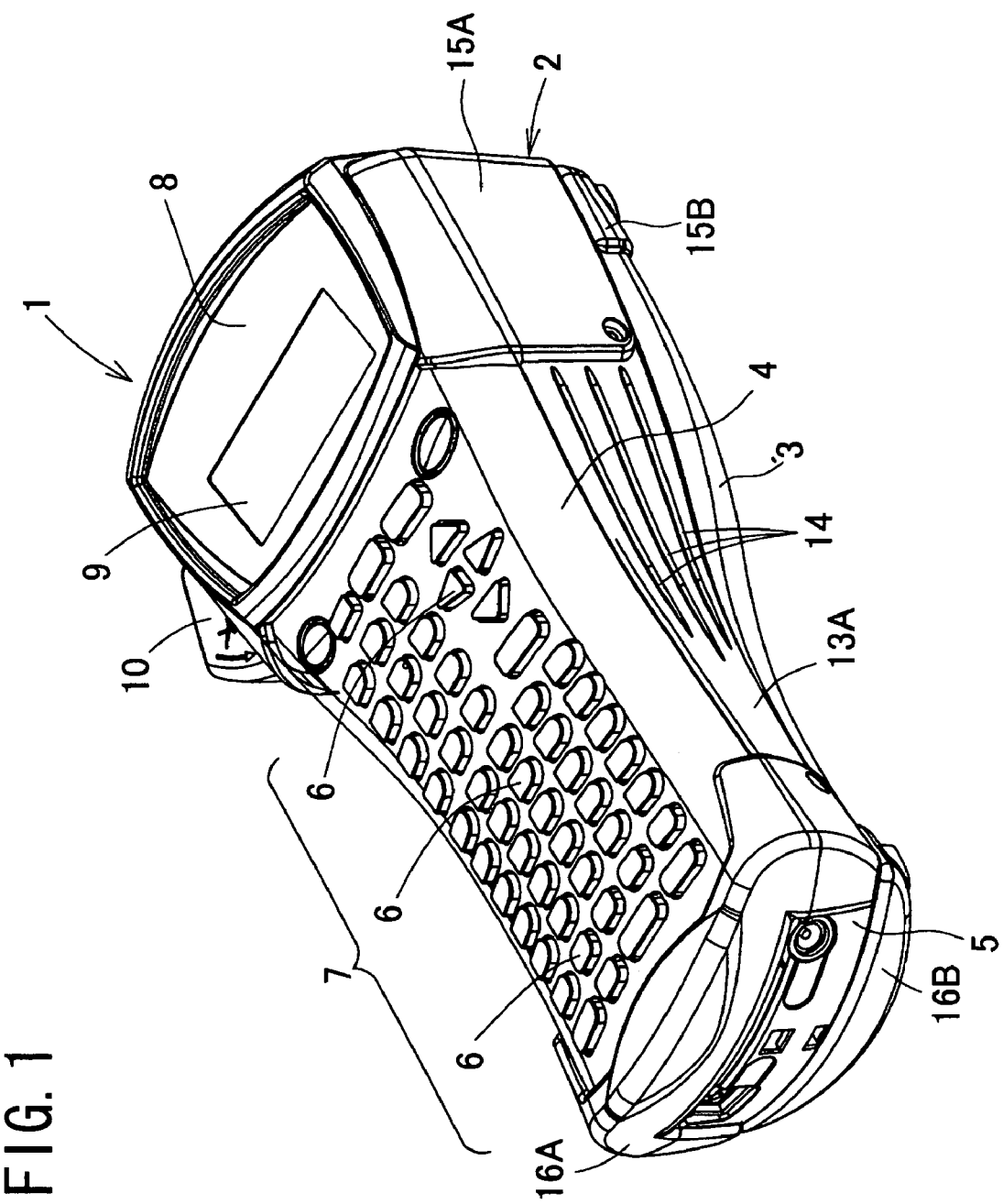
FIG. 1 is a schematic appearance perspective view of a tape printing apparatus of an exemplary embodiment.
Figure 2:
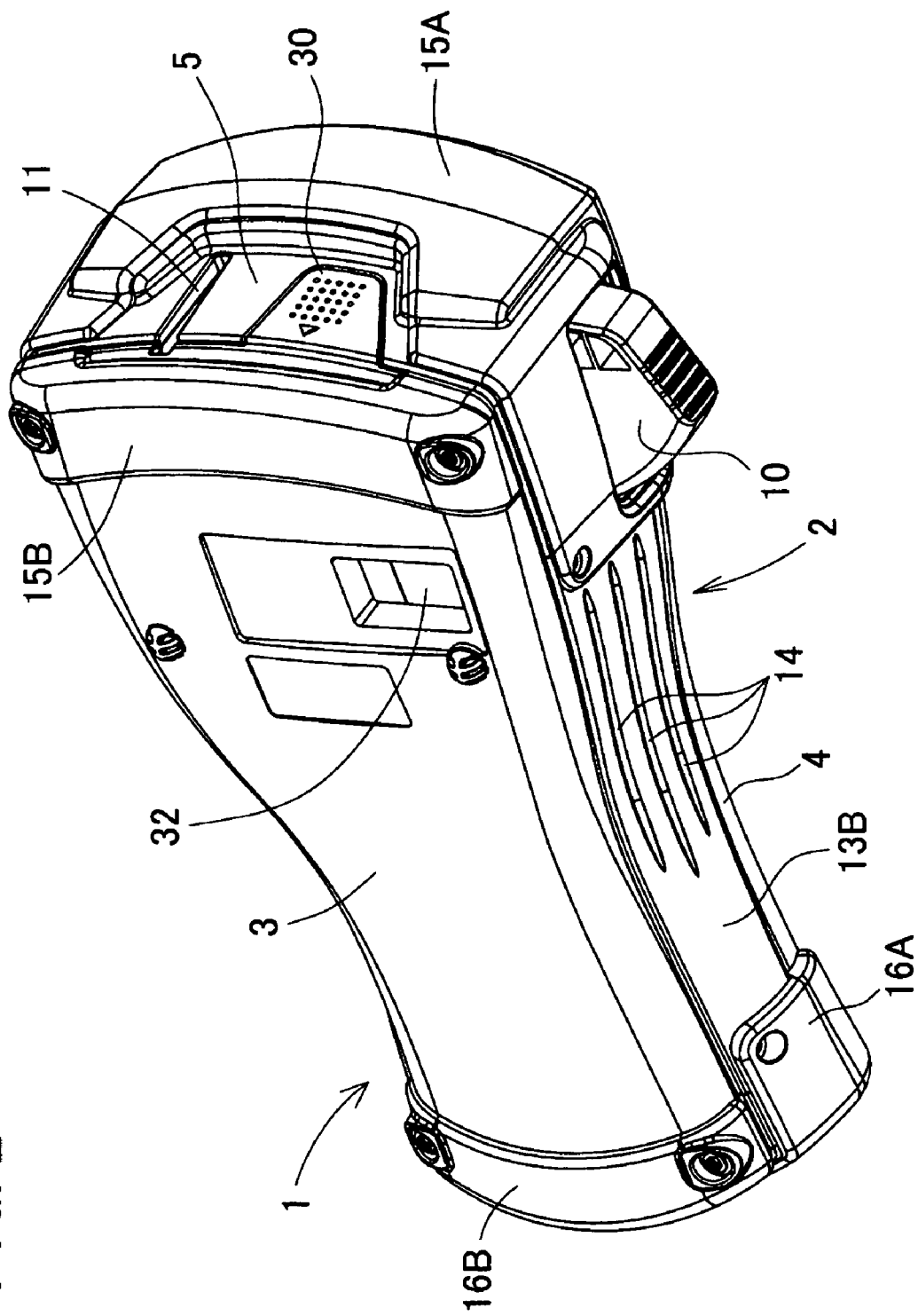
FIG. 2 is a schematic appearance perspective view of the tape printing apparatus of the embodiment as seen from its rear side.

Hereinafter, a tape printing apparatus, which includes an exemplary embodiment of the electronic apparatus of the invention, is described in detail with reference to the accompanying drawings. First, a schematic structure of the tape printing apparatus of this exemplary embodiment is described with reference to FIGS. 1 and 2. FIG. 1 is a perspective view showing an entire tape printing apparatus. FIG. 2 is a perspective view showing the rear side of the tape printing apparatus.

As shown in FIGS. 1 and 2, the tape printing apparatus 1 comprises a main body 2 made of polystyrene, or any suitable material, and a rear cover 3 made of polystyrene, or any suitable material, mounted detachably so as to cover the entire rear face (a face opposite to a face opposing user when the tape printing apparatus 1 is used) of this main body 2. The main body 2 comprises an upper unit 4 and a lower unit 5. The upper unit 4 has a key arrangement section 7 in which various kinds of keys 6, such as character keys for inputting characters, print key for executing print and the like, are disposed on the surface thereof. A lateral window section 8 is disposed in the right/left direction substantially in the center of the surface on its top face. A display 9 for displaying characters and the like inputted through the key 6 is disposed in this window section 8.

A cutter lever 10 is provided on the left side face of the display 9 of the main body 2. By pressing this cutter lever 10 inward, a tape 12 (see FIG. 3) discharged from a tape discharge slot 11 formed at a top end section can be cut out with a cutter (not shown). The tape 12 is comprised of an image receiving paper on which characters are printed, an adhesive layer and a separator for preventing the adhesive surface from sticking to an undesired portion.

The lateral width of the upper unit 4 having the key arrangement section 7 is smaller than the lateral width of a section having the window section 8. Grip members 13A, 13B are attached to both sides of the lower unit 5. The grip members 13A, 13B are formed of a styrene based elastomer resin, or any suitable elastic material, to prevent slippage and constructed to be gripped easily by an operator. Because the grip members 13A, 13B are mounted to form the same plane as the main body 2 and the rear cover 3 as described later, there is no fear that a user's finger may be caught by an end section of the grip members 13A, 13B. Further, three protruding rows 14 are formed in parallel to the apparatus on the surface of the grip members 13A, 13B to better prevent slippage.

The tape printing apparatus 1 has a first protector member 15A, 15B for covering an end section provided with a display 9 and a second protector member 16A, 16B which is formed separately from the first protector member 15A, 15B for covering an end section on an opposite side to the end section provided with the display 9. The respective protector members 15A, 15B, 16A, 16B are constructed of the upper unit 4, the lower unit 5 and the rear cover 3 separately. A first protector member 15A and a second protector member 16A are attached to the upper unit 4 and the lower unit 5, and a first protector member 15B and a second protector member 16B are attached to the rear cover 3.

Because the protector members 15A, 15B, 16A, 16B are formed of styrene base resin or any suitable material having elasticity like the aforementioned grip member 13, the protector members 15A, 15B, 16A, 16B relax an impact which occurs when the tape printing apparatus 1 drops, thereby protecting the exterior face of the apparatus from damage.

Figure 3:
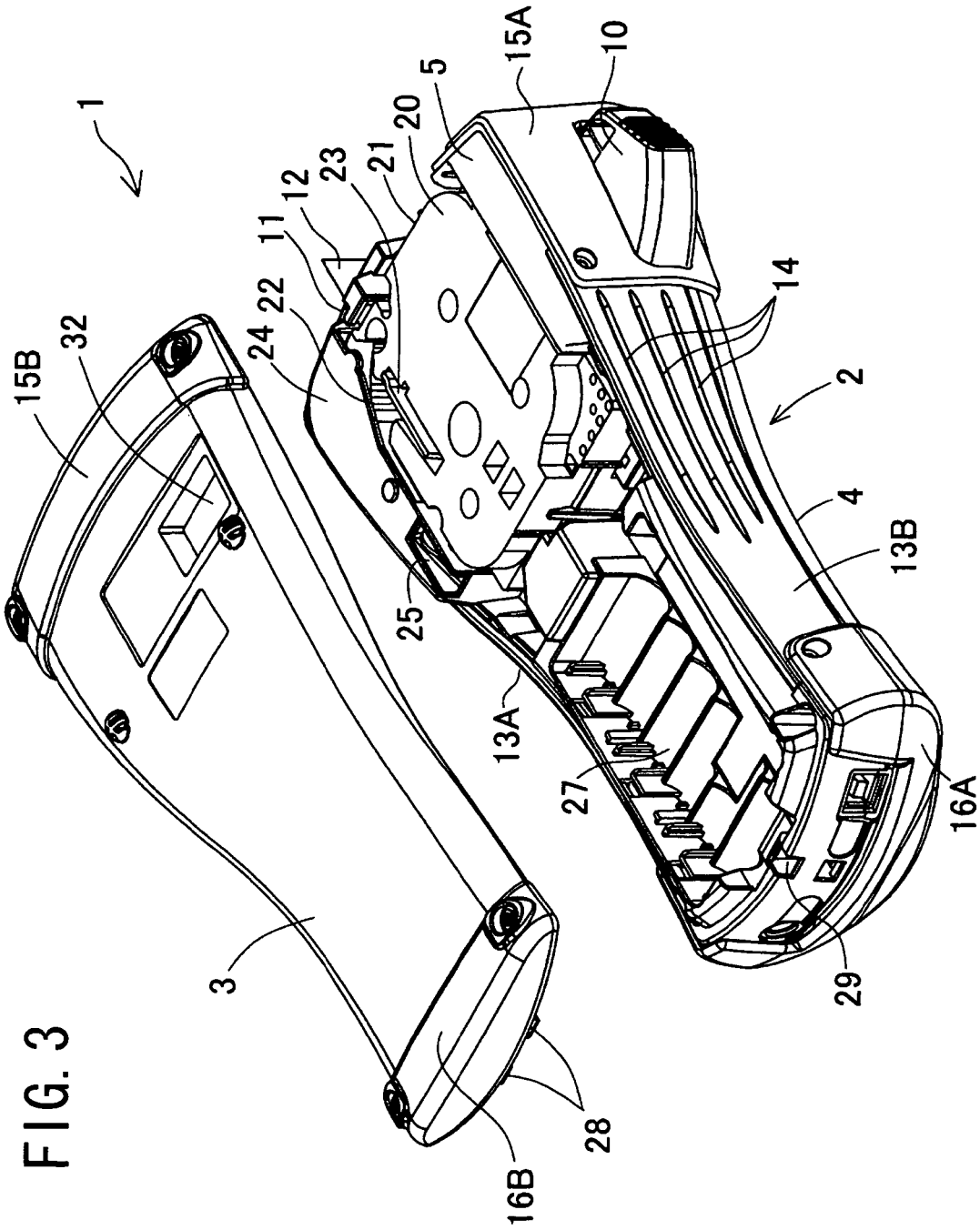
FIG. 3 is a perspective view of the interior of the lower unit in the tape printing apparatus of the embodiment.

Next, an internal structure of the lower unit 5 will be described with reference to FIG. 3. FIG. 3 is a perspective view showing the tape printing apparatus when the rear cover is detached as viewed from the rear side.

As shown in FIG. 3, the lower unit 5 is provided with a cassette accommodating section 21, which is substantially of the same shape as the external shape of a tape cassette 20, and protrudes by an amount equal to the thickness of the tape cassette 20 from the rear face. In the vicinity of an end section on the cutter lever 10 side of this cassette accommodating section 21 is erected a thin thermal head mounting section 23, on which the thermal head 22 is to be mounted, at a right angle along the length direction of the apparatus. A platen holder (not shown) is provided rotatably at a drive section 24 provided on the side portion of the cassette accommodating section 21 opposite the thermal head 22.

When the rear cover 3 is attached to the bottom of the lower unit 5, a protrusion (not shown) provided on an inside face of the rear cover 3 is inserted into an engaging hole 25 in the drive section 24. A platen holder is rotated to the side of the thermal head 22 and at the same time, the platen holder is rotated to the side of the tape cassette 20 until part of a tape 12 of the tape cassette 20 is pressed against the thermal head 22 and fixed thereto. Accordingly, the tape 12 which is printed through the thermal head 22 is carried by a tape carrying mechanism (not shown) containing a drive motor and discharged through a tape discharge slot 11.

A battery accommodating section 27, in which, for example, six batteries are to be accommodated in parallel, is formed opposite to the side provided with the cassette accommodating section 21 in the lower unit 5, such that they are protruded to the rear face with respect to the bottom face of the cassette accommodating section 21. The six batteries accommodated in the battery accommodating section 27 are connected in series.

A control circuit (not shown) in which a control circuit section is constructed is disposed inside the upper unit 4.

When the rear cover 3 is attached to the bottom of the lower unit 5, a first insertion section 28, formed at an end section on the side in which the second protector member 16B is provided, is inserted into an insertion groove 29 in the lower unit 5. A second insertion section 30 provided on an opposite side to the first insertion section 28 is engaged with a fixing section (not shown) provided on the lower unit 5. Consequently, the rear cover 3 is attached to the bottom of the tape printing apparatus. Because it is so constructed, the second insertion section 30 may be released from the fixing section when the second insertion section 30 is pushed inward of the apparatus, with the rear cover 3 mounted thereto. Thus, the rear cover 3 is easily detachable from the lower unit 5. When the rear cover 3 is detached, the tape cassette 20 can be taken out from the cassette accommodating section 21. Batteries accommodated in the battery accommodating section 27 can also be taken out successively and replaced. Because the protector members 15A, 15B, 16A, 16B are constructed separately between the main body 2 and the rear cover 3, the rear cover can be opened/closed without detaching the respective protector members 15A, 15B, 16A, 16B from the tape printing apparatus 1.

The rear cover 3 has a check window 32 at a section opposing the tape cassette 20 accommodated in the lower unit 5 and the protector member 15B is attached to the rear cover 3 without covering this check window 32. Therefore, the type of the tape cassette 20 accommodated in the cassette accommodating section 21 can be confirmed through this check window 32 without opening the rear cover 3.

As shown in FIG. 2, the first protector member 15A, at a section covering a top face on the side of the display 9 of the tape printing apparatus 1, is cut out so as not to cover the tape discharge slot 11 and the second insertion section 30. Consequently, the first protector member 15A does not obstruct discharge of the tape 12 when the first protector member 15A is mounted on the side of the display 9. Further, when the rear cover 3 is detached from the lower unit 5, the operation of pressing the second insertion section 30 into the inside of the apparatus is not obstructed. Therefore, a printed tape 12 can be discharged from the tape discharge slot 11 with the first protector member 15A mounted and the rear cover 3 can be detached from the lower unit 5 by pressing the second insertion section 30 into the inside of the apparatus.

When the first protector member 15A is installed on the upper unit 4 and the lower unit 5, the surface of the second insertion section 30 is lower than the surface of the first protector member 15A, i.e., concaved. Thus, if the tape printing apparatus 1 drops on the ground, there is no fear that the second insertion section 30 may be pressed in so that the rear cover 3 becomes detached because the first protector member 15A would make contact with the ground before the second insertion section 30.

Figure 4:
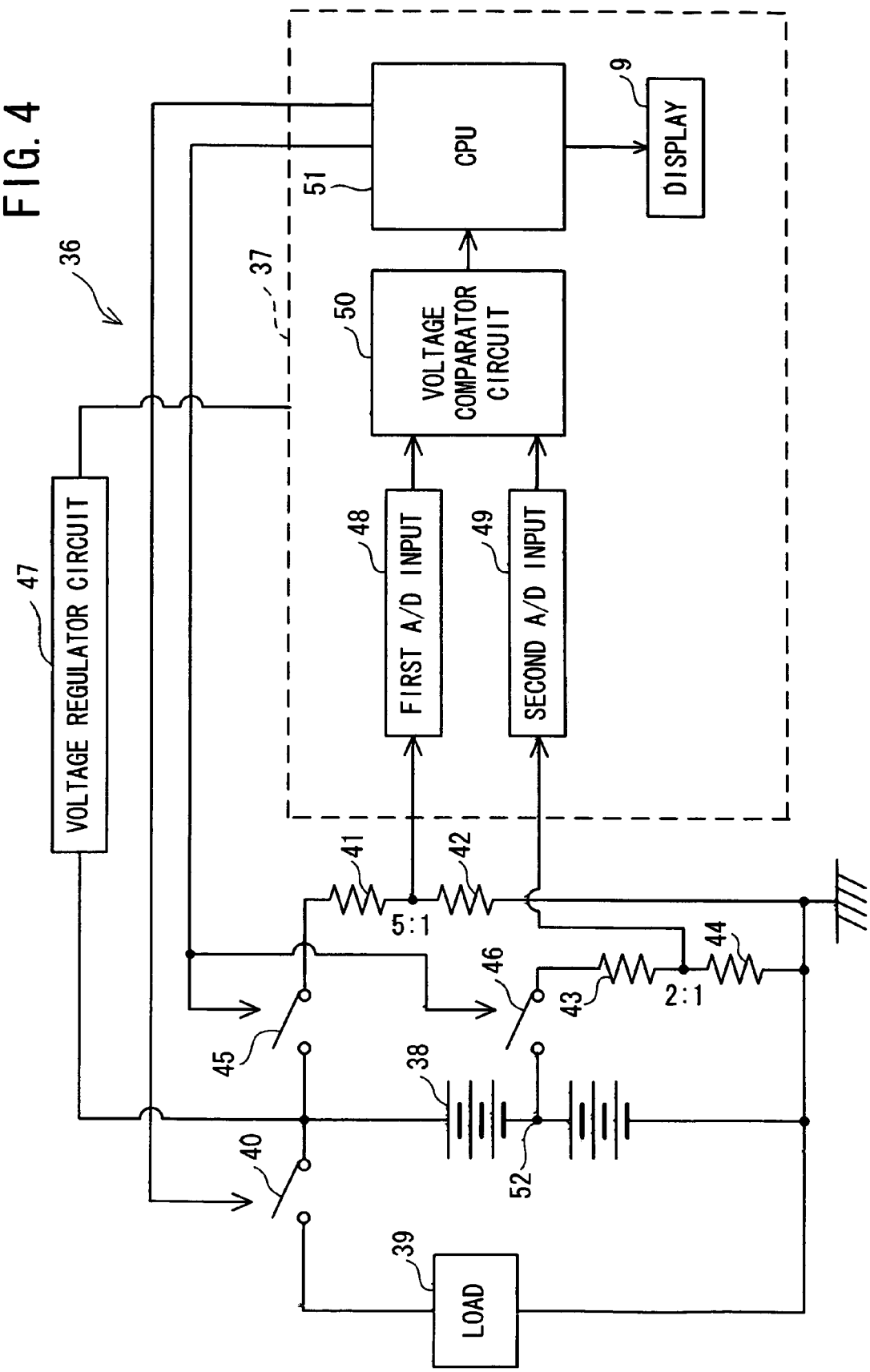
FIG. 4 is a diagram showing a battery characteristic detecting mechanism of the embodiment.

Next, a control system for the tape printing apparatus 1 will be described with reference to FIG. 4. FIG. 4 is an entire diagram showing the entire structure of the battery characteristic detecting mechanism of the tape printing apparatus of this embodiment.

The battery characteristic detecting mechanism 36 of this exemplary embodiment comprises a control circuit section 37, six batteries 38 connected in series, a first switch 40 for controlling the supply of power to a load 39, resistors 41, 42, 43, 44, a second switch 45 for controlling the supply of power to each resistor and the control substrate section 37, a third switch 46, and a voltage regulator circuit 47 for adjusting a voltage applied to the control substrate section 37. Further, the control substrate section 37 that includes battery characteristic detecting section, comprises a liquid crystal display 9, first analog to digital converter (hereinafter abbreviated as A/D) input 48 and second A/D input 49 for measuring a voltage, a voltage comparator circuit 50 for comparing a voltage and a CPU 51 for controlling the respective devices.

When the tape printing apparatus 1 is powered on, the second switch 45 and the third switch 46 are turned on, so that electric power is supplied to the control circuit section 37. Further, these switches are turned off to shut down the power to the tape printing apparatus 1.

The first switch 40 is connected to the CPU 51 and turned on for the above-described print operation and turned off for other processes than printing.

The load 39 is constituted of a thermal head 22 and a drive motor contained in the tape carrying mechanism. When the first switch 40 is turned on for print processes, which will be described later, electric power is supplied from the battery 38. For the processes other than printing, the first switch 40 is turned off so as to stop the supply of electric power of the battery 38.

The resistors 41, 42 are connected in series and connected to the six batteries through the second switch 45 in parallel. Because the resistor 41 and resistor 42 are set at the ratio of 5:1 in terms of resistance value, a voltage ⅙ the voltage (first voltage) of the six entire batteries 38 is detected between the resistor 41 and the resistor 42. The first A/D input 48 is connected between the resistor 41 and the resistor 42 and a voltage which is ⅙ the first voltage is measured. This measured voltage is an average voltage of a single battery of the six batteries.

An end of the resistor 43 is connected to a connecting point 52 which divides the six batteries to three batteries each through a third switch 46. The other end of the resistor 43 is connected to an end of the resistor 44 and the other end of the resistor 44 is grounded. Because the resistances of the resistor 43 and resistor 44 are set to 2:1, a voltage produced by dividing the voltage (second voltage) of the batteries 38 of three batteries separated by the connecting point 52 by three is detected between the resistor 43 and resistor 44. The second A/D input 49 is connected between the resistor 43 and resistor 44 to measure a voltage produced by dividing the second voltage by three. This measured voltage is an average voltage for each battery to the three batteries on the grounding side separated by the connecting point 52. Therefore, the battery characteristic detecting mechanism 36 is capable of measuring an average voltage of each battery with the respective resistors 41, 42, 43, 44 for the first voltage and second voltage.

The voltage regulator circuit 47 adjusts a voltage applied to the battery characteristic detecting section 36 to a constant level. According to this exemplary embodiment, the voltage is adjusted to 5V.

Although in the battery characteristic detecting mechanism 36 of this embodiment, the connecting point 52 is set up between the third and fourth batteries to detect the voltage of the three batteries 38 as the second voltage, the connecting point which detects the voltage of 1-5 batteries as the second voltage by changing the ratio in resistance of the resistors 43, 44 may be set arbitrarily in an interval from between the first and second batteries 38 to between the fifth and sixth batteries 38. Needless to say, the ratio between the resistor 43 and resistor 44 is changed so as to detect an average voltage of each battery to the second voltage between the resistor 43 and resistor 44 corresponding to the set connecting point 52.

The average voltage of the first voltage and second voltage measured by the first A/D input 48 and second A/D input 49 is compared by the voltage voltage comparator circuit 50. The CPU 51 judges the battery characteristic based on a comparison result and controls the supply of power with the first switch 40, second switch 45 and third switch 46 as required.

Figure 5:
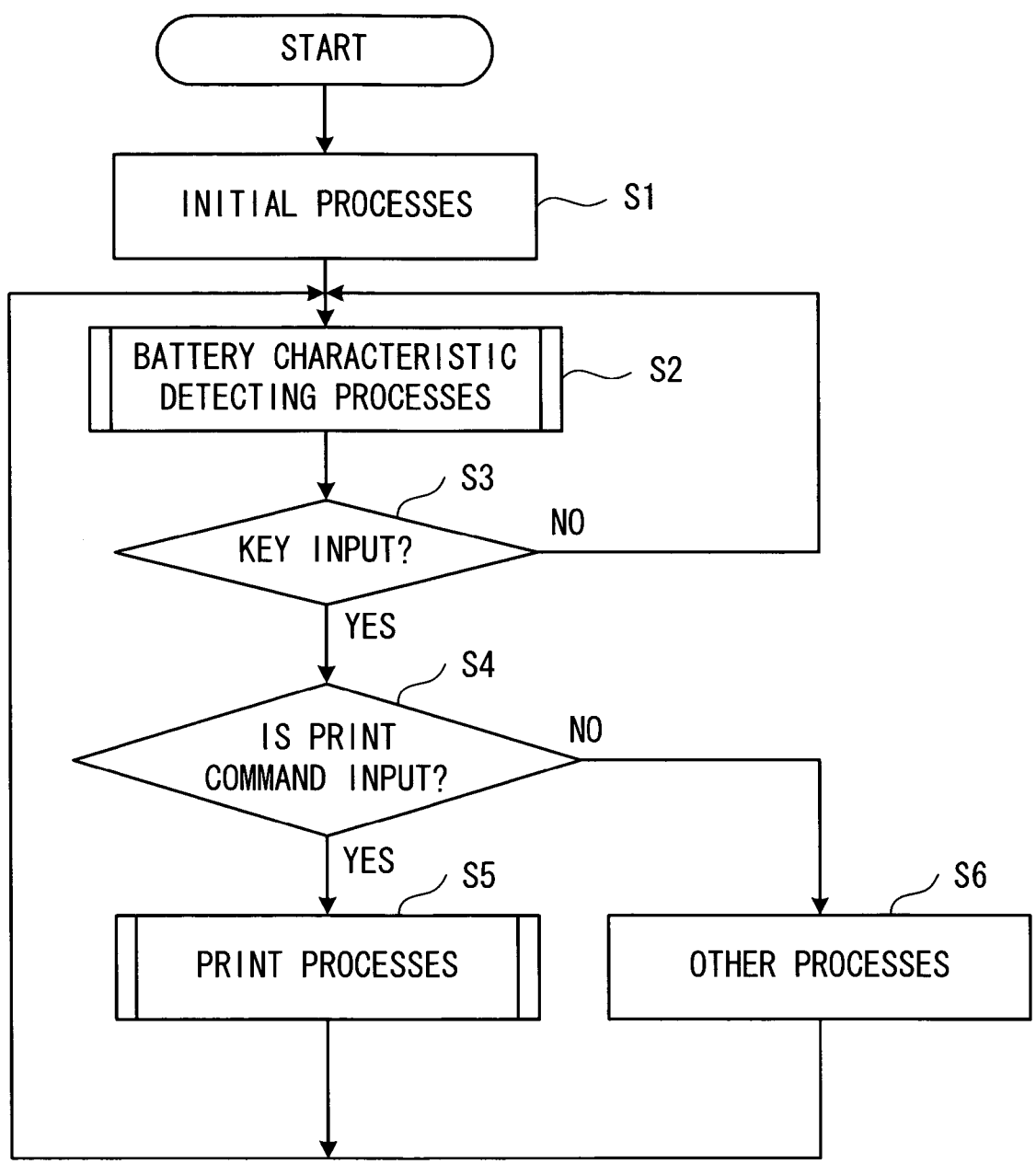
FIG. 5 is a flow chart of a main system control program of the tape printing apparatus of the embodiment.
Figure 6:
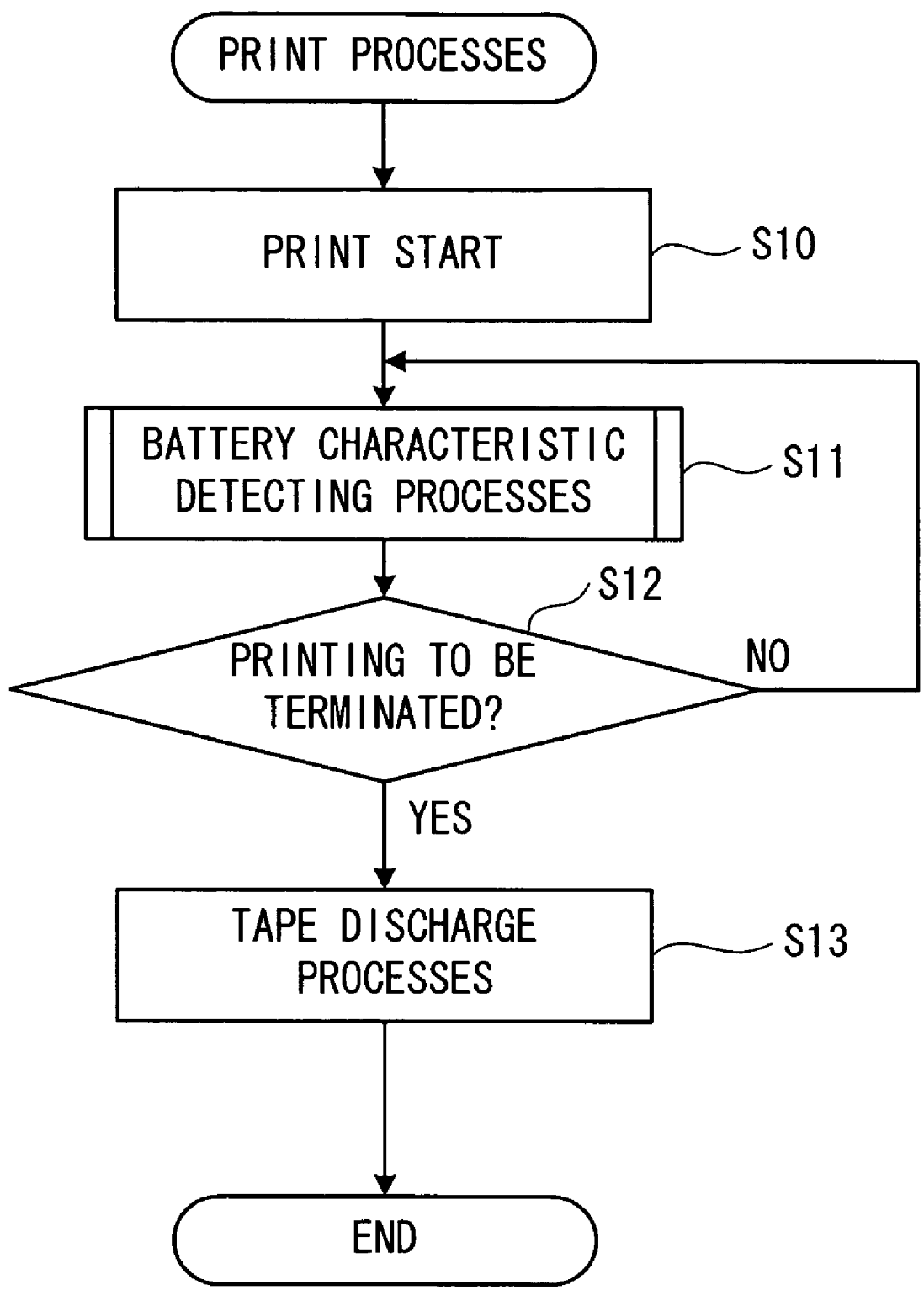
FIG. 6 is a flow chart of a print control program for the tape printing apparatus of the embodiment.

Next, the operation of the tape producing apparatus 1 having the above-described structure will be described with reference to FIGS. 5, 6. FIG. 5 is a flow chart for the main system control program of the tape producing apparatus 1.

First, in step S1, initialization, such as clearing of each memory, is carried out.

In S2, battery characteristic detecting processes for detecting whether any battery having a different characteristic is mixed is carried out by the battery characteristic detecting mechanism 36. The detail of the battery characteristic detecting processes will be described later.

In S3, whether a key input is made from any key 6 of the key arrangement section 7 is determined. If no key input is made (S3: NO), the procedure proceeds to S2 and waits until any key input is made and if a key input is made (S3: YES), the procedure proceeds to S4.

In S4, whether an inputted key is print key is determined and if the inputted key is the print key (S4: YES), the procedure returns to S2 after print processes are executed based on the inputted data (S5). If no printing processes are executed (S4: NO), the procedure returns to S2 after other processes corresponding to the particular inputted key, for example, input, deletion, edition, or the like, of character data is executed.

The print processes of S5 will be described with reference to FIG. 6. FIG. 6 is a flow chart of the print control program.

First, in S10, print is started. More specifically, a dot pattern for printing is created and every dot line is printed on the tape 12 by a thermal head 22. Battery characteristic detecting processes are carried out during print (S11). The detail of the battery characteristic detecting processes will be described later.

In S12, whether the print is to be terminated is determined and if the print is not to be terminated (S12: NO), the procedure proceeds to S11 to continue to print. If printing is to be terminated (S12: YES), the procedure proceeds to S13.

Although the battery characteristic detecting processes (S11) during print is executed for every print of a line according to this embodiment, it may be executed for any line number other than every line.

In S13, tape discharge processes are carried out. A tape 12 printed through the thermal head 22 is carried and discharged from the tape discharge slot 11. Then, by pressing the cutter lever 10 inward, the tape 12 discharged from the tape discharge slot 11 can be cut by a cutting blade (not shown).

Figure 7:
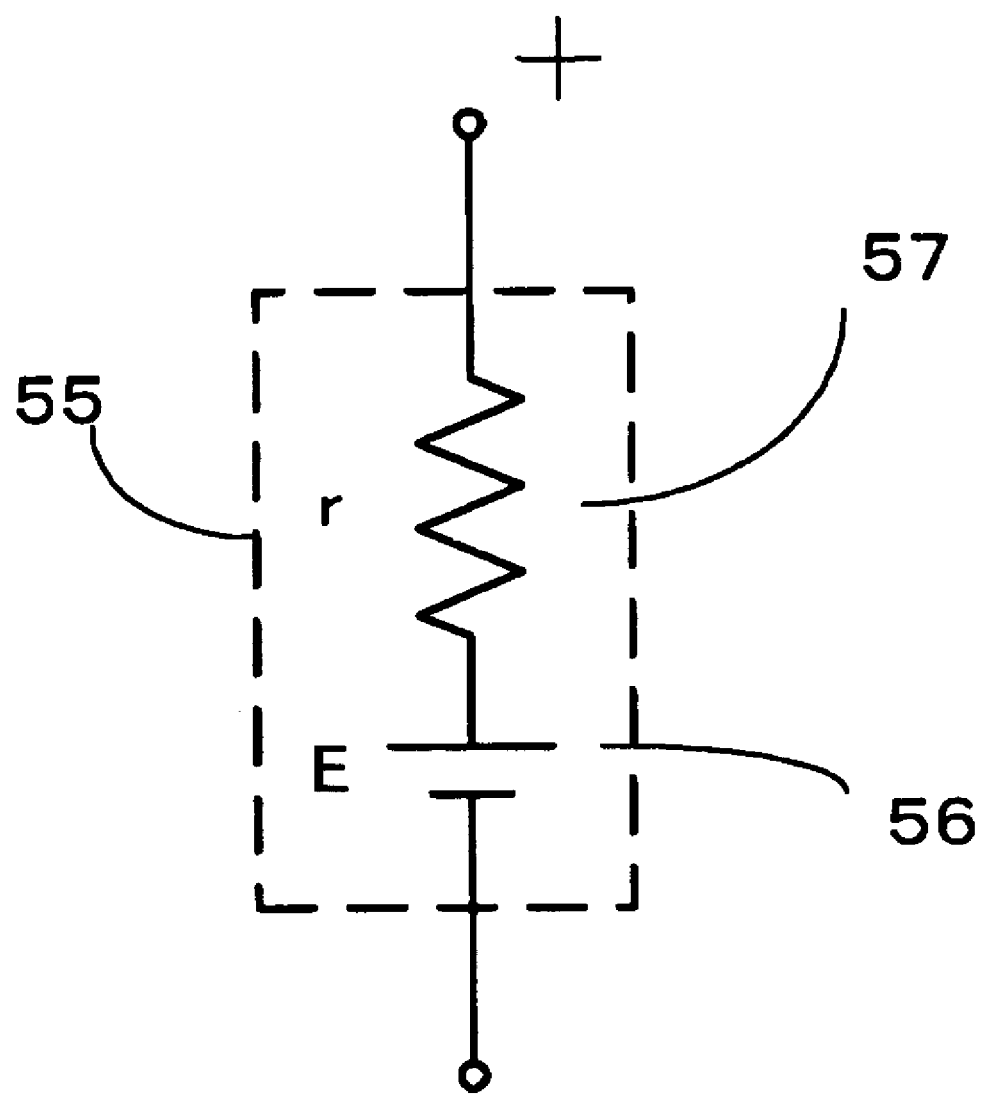
FIG. 7 is an explanatory diagram showing schematically the battery by electromotive force and internal resistance.

Generally, the battery power can be expressed with an equivalent voltage source in which an electromotive force E and an internal resistance r are connected in series. FIG. 7 is an explanatory diagram which expresses the battery schematically with the electromotive force and internal resistance.

As indicated in FIG. 7, a battery 55 can be expressed in the form that the electromotive force 56 and internal resistance 57 are connected in series. The electromotive force 56 and internal resistance 57 each have a specified value depending on the type of battery 55. FIG. 8 shows an example of the electromotive force 56 and internal resistance 57 for several types of batteries.

Referring to FIG. 8, the electromotive force 56 of an alkaline battery (primary battery) is 1.5 V and the internal resistance 57 is 0.4 Ω. The electromotive force 56 of a manganese battery (primary battery) is 1.5 V and the internal resistance 57 is 1.2 Ω. The electromotive force 56 of a Ni-MH battery (secondary battery/storage battery) is 1.2 V and the internal resistance 57 is 0.2 Ω. Therefore, a difference in terminal voltage is generated depending on the quantity of current flowing through a circuit, that is, the magnitude of a current load applied to a battery in various types of batteries each having a different value in the electromotive force 56 and internal resistance 57.

Figure 9A:
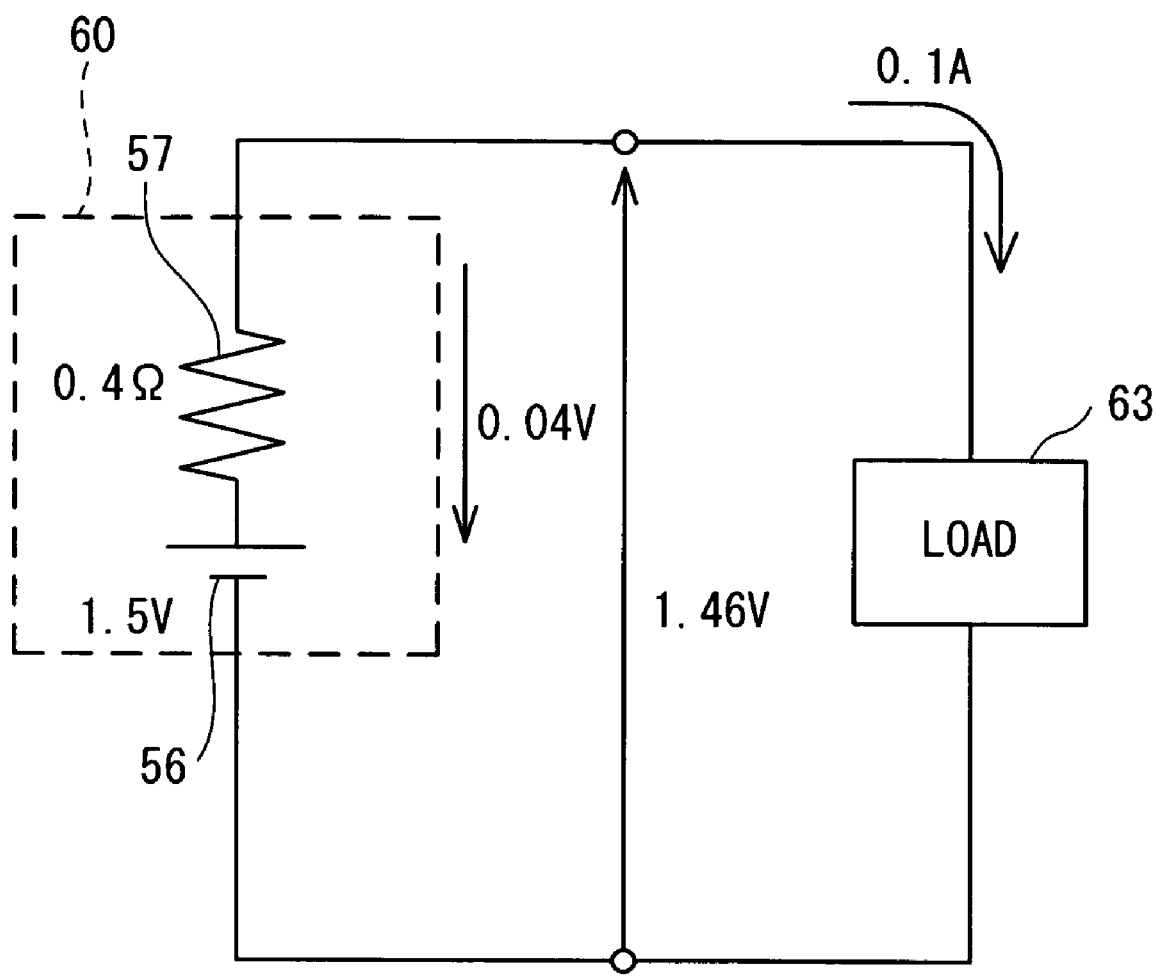
FIG. 9A is an explanatory diagram showing the terminal voltage of an alkaline battery when current load is small.
Figure 9B:
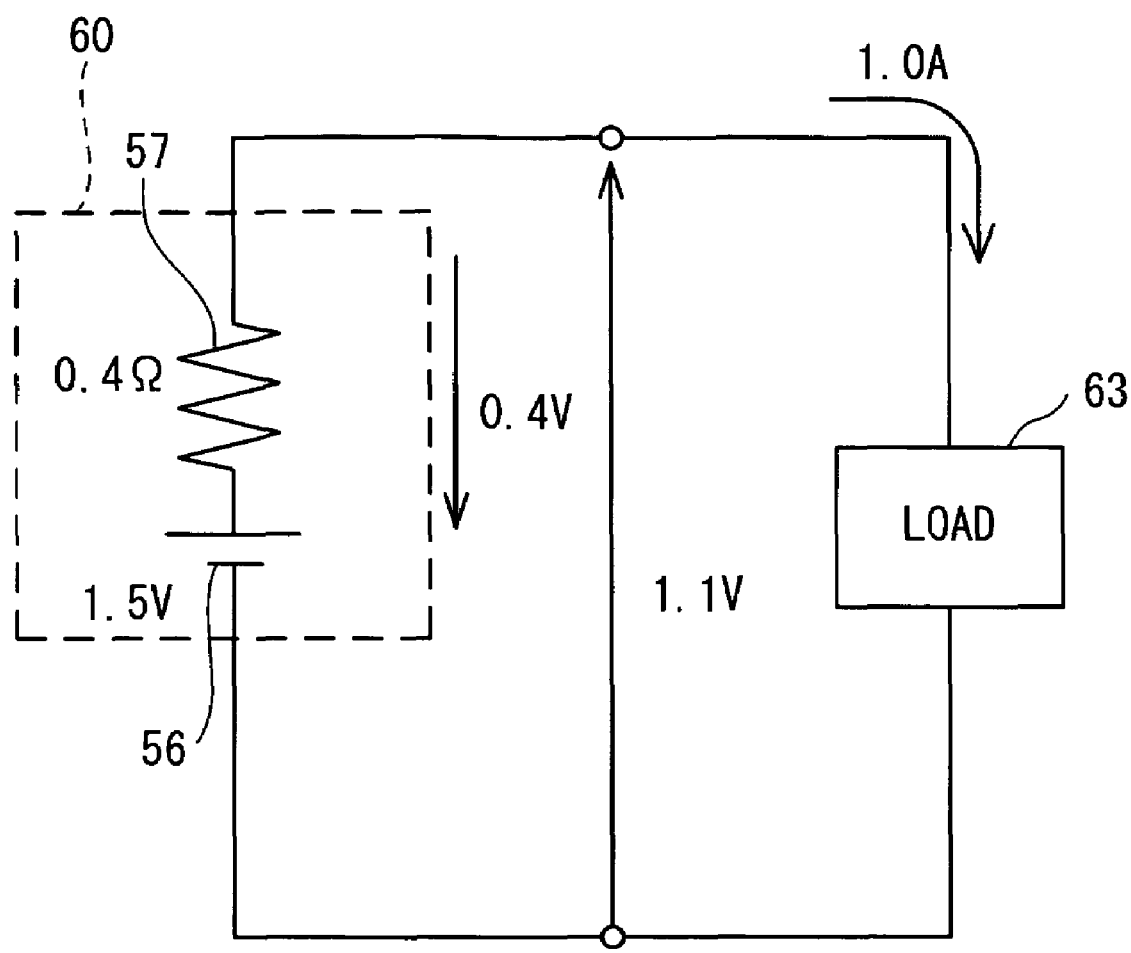
FIG. 9B is an explanatory diagram showing the terminal voltage of an alkaline battery when current load is large.
Figure 10A:
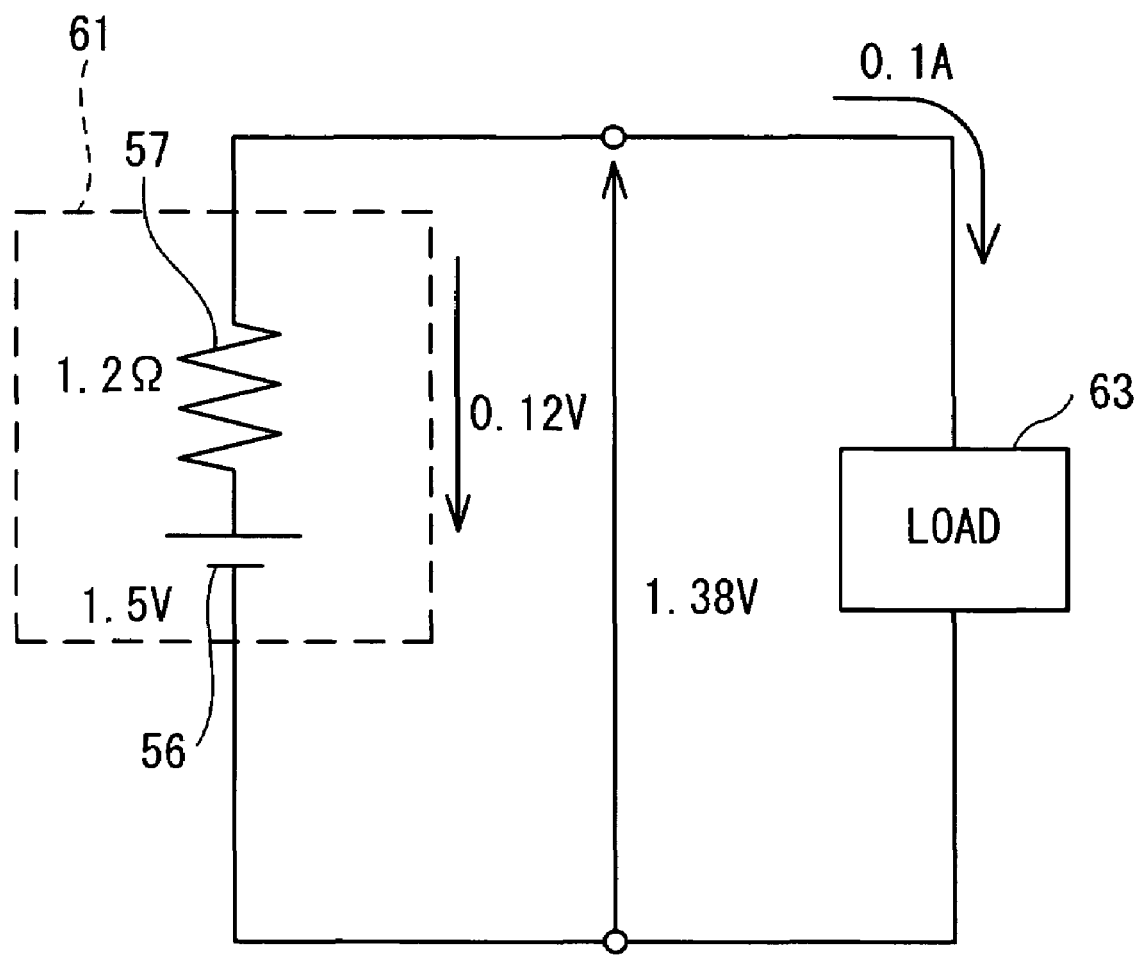
FIG. 10A is an explanatory diagram showing the terminal voltage of a manganese battery when current load is small.
Figure 10B:
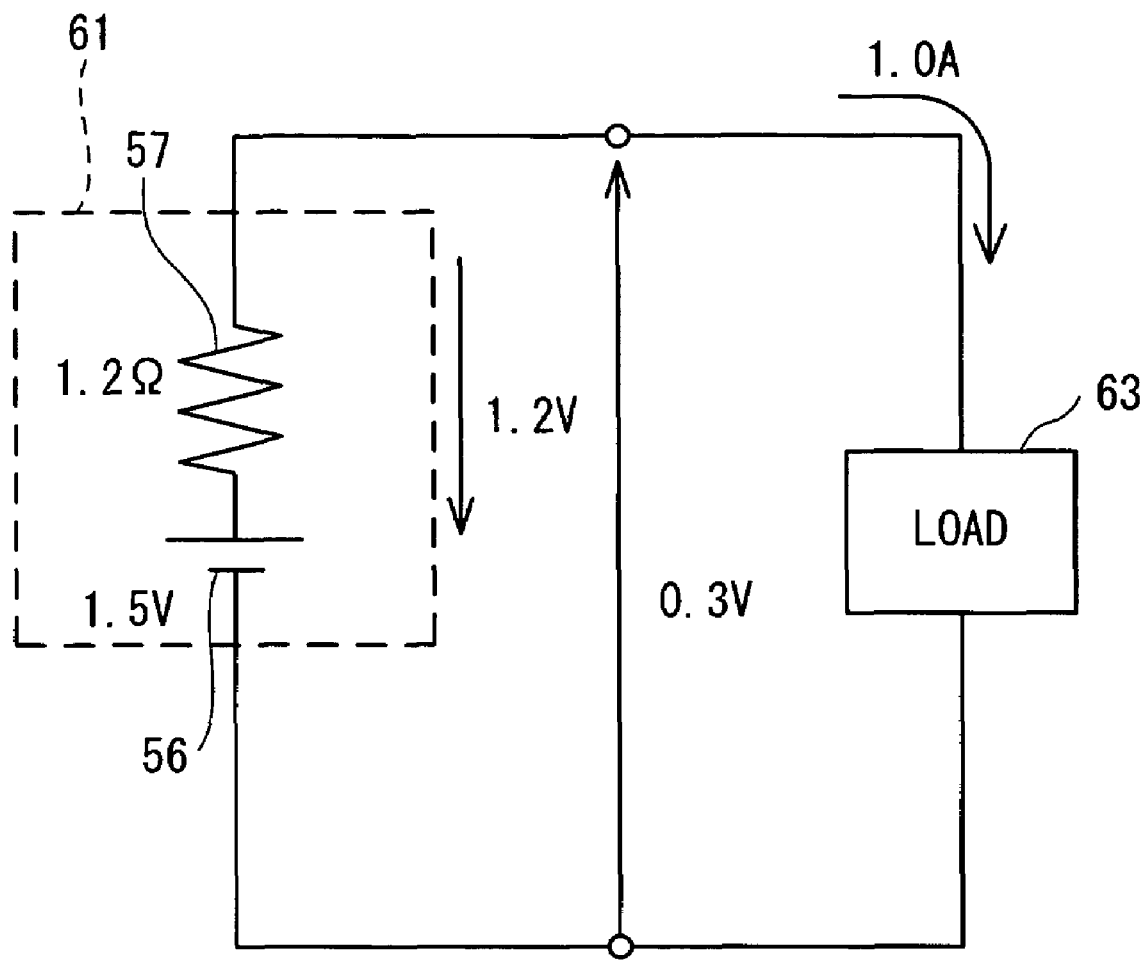
FIG. 10B is an explanatory diagram showing the terminal voltage of a manganese battery when current load is large.
Figure 11A:
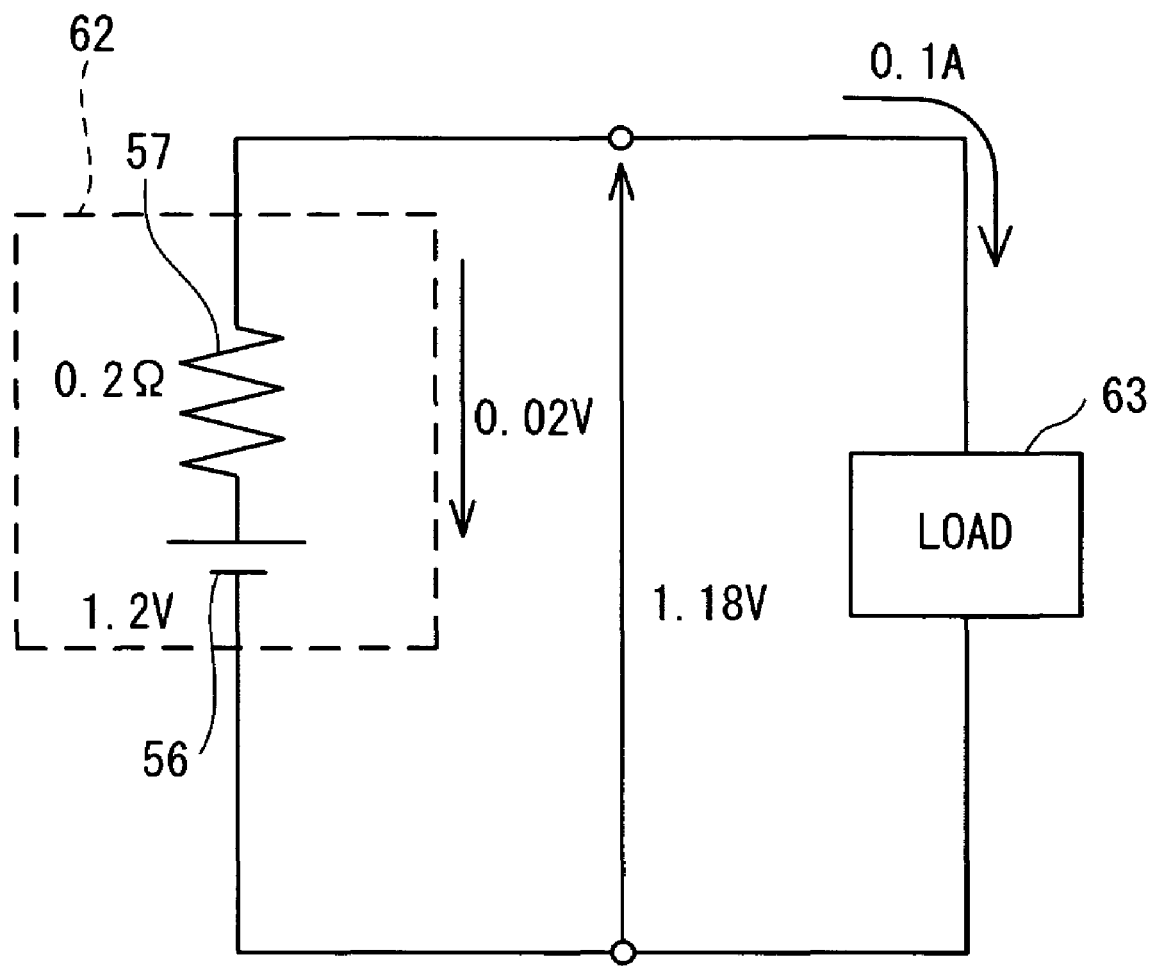
FIG. 11A is an explanatory diagram showing the terminal voltage of a Ni-MH battery when current load is small.
Figure 11B:
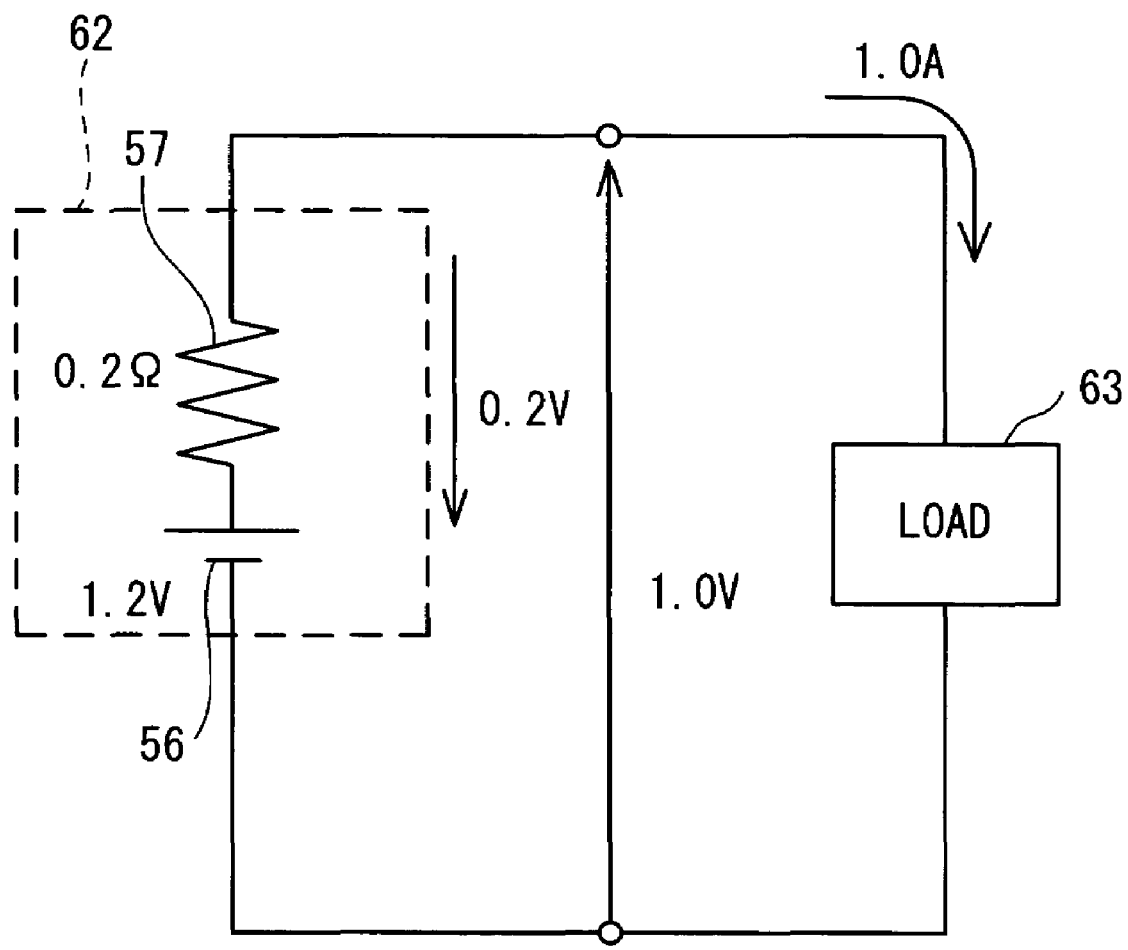
FIG. 11B is an explanatory diagram showing the terminal voltage of a Ni-MH battery when current load is large.

Specific examples will now be described using an alkaline battery 60, a manganese battery 61 and a Ni-MH battery 62. FIG. 9A is an explanatory diagram showing the terminal voltage of the alkaline battery 60 when the current load is small. FIG. 9B is an explanatory diagram showing the terminal voltage of the alkaline battery 60 when the current load is large. FIG. 10A is an explanatory diagram showing the terminal voltage of the manganese battery 61 when the current load is small. FIG. 10B is an explanatory diagram showing the terminal voltage of the manganese battery 61 when the current load is large. FIG. 11A is an explanatory diagram showing the terminal voltage of a Ni-MH battery 62 when the current load is small. FIG. 11B is an explanatory diagram showing the terminal voltage of the Ni-MH battery 62 when the current load is large.

If the quantity of current flowing through a circuit is small (0.1 A is assumed in this description) in a circuit in which a battery of each kind is connected to a load 63, as indicated in FIGS. 9-11, the terminal voltage of each battery is 1.46 V for the alkaline battery 60, 1.38 V for the manganese battery 61 and 1.18 V for the Ni-MH battery 62.

Therefore, although the voltage between the alkaline battery 60 and the manganese battery 61 is difficult to compare because a difference in voltage therebetween is minute, it is easy to distinguish between the alkaline battery 60 and manganese battery 61 and between the manganese battery 61, and the Ni-MH battery 62, because the difference in voltage is as large as 0.28 and 0.20V, respectively.

When the quantity of current flowing through a circuit is large (1.0 A is assumed in this description), the terminal voltage of each kind of the battery is 1.1 V for the alkaline battery 60, 0.3 V for the manganese battery 61 and 1.0 V for the Ni-MH battery 62.

Therefore, although it is difficult to distinguish between the alkaline battery 60 and the Ni-MH battery 62 because the difference in voltage therebetween is minute, it is easy to distinguish between the alkaline battery 60 and the Ni-MH battery 62, and between the Ni-MH battery 62 and the manganese battery 61, because the difference in voltage is as large as 0.8 V and 0.7 V, respectively.

However, measuring each battery and comparing if a plurality of batteries are connected in an actual circuit leads to enlargement of a necessary apparatus thereby deteriorating the portability of the apparatus. Thus, according to this embodiment, an average voltage per battery of the entire batteries is compared with an average voltage per battery at an arbitrary connecting point by the battery characteristic detecting mechanism 36, as described above.

Hereinafter, an example of a detecting mechanism which detects that batteries, each having a different characteristic, are mixed in actually connected batteries by measuring the voltage of the all the batteries with a voltage of three of the batteries is shown.

Figure 12:
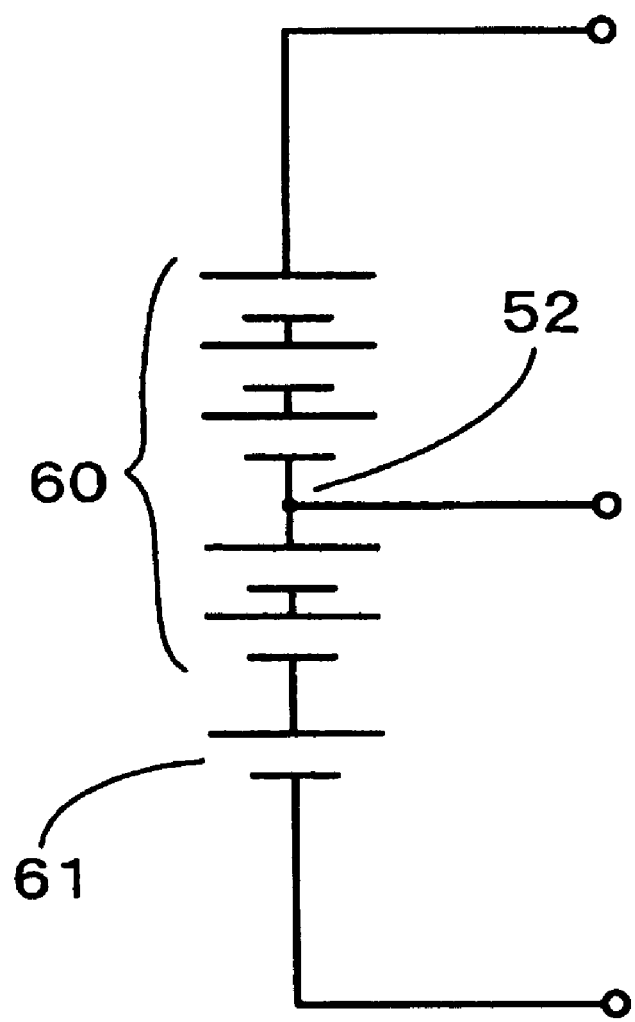
FIG. 12 is a circuit diagram in the vicinity of batteries when an alkaline battery and a manganese battery are mixed.
Figure 13:
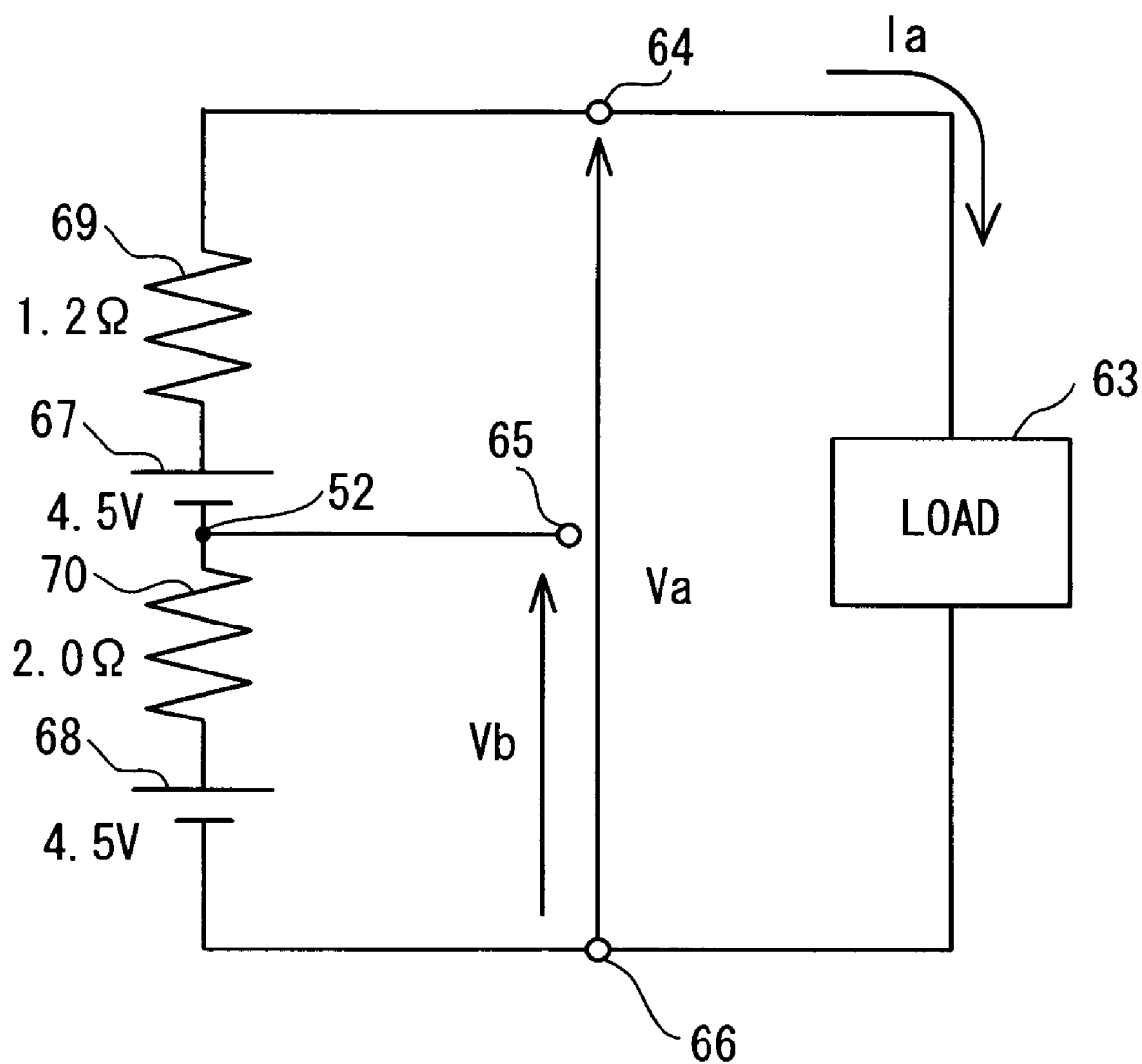
FIG. 13 is a circuit diagram showing a case where an alkaline battery and a manganese battery are mixed.

First, an example where five alkaline batteries and a single manganese battery are mixed together in six batteries connected in series will be described with reference to FIGS. 12-14. FIG. 12 is a circuit diagram of battery connection when the alkaline batteries and manganese batteries are mixed. FIG. 13 is a circuit diagram showing a case where the alkaline batteries and manganese batteries are mixed. FIG. 14 is a diagram showing respective voltage values when the alkaline batteries and manganese batteries are mixed.

When five alkaline batteries 60 and a single manganese battery 61 are connected in series, as shown in FIG. 12, the voltage of the entire six batteries, including the alkaline batteries 60 and manganese batteries 61, and the voltage of three batteries, separated by the connecting point 52, to a low voltage side are measured.

The total electromotive force of the three batteries (between points 64 and 65) constituted of only the alkaline batteries 60 is 4.5 V and the total internal resistance is 1.2 Ω. On the other hand, the total electromotive force of three batteries (between points 65 and 66) including the manganese battery 61 is 4.5 V and the total internal resistance is 2.0Ω. Thus, if the above-described power is expressed using an equivalent voltage power, it can be expressed with the electromotive forces 67, 68 and the internal resistances 69, 70.

Therefore, as shown in FIG. 14, the voltage Va of the entire six batteries, including the alkaline batteries 60 and manganese batteries 61 (voltage between points 64 and 66), is 8.68 V if a current Ia flowing through a circuit is small (0.1 A). The voltage of the three batteries (voltage between points 65 and 66) on the low voltage side, including the manganese batteries 61, separated by the connecting point 52 is 4.3 V. If the current Ia flowing through a circuit is large (1.0 A), the Va is 5.8 V and the Vb is 2.5 V.

If average voltages V1 and V2 per battery at the respective voltages Va and Vb are calculated, V1 is 1.45 V when the current Ia flowing through a circuit is small (0.1 A) and V2 is 1.43 V. When the current Ia flowing through the circuit is large (1.0 V), V1 is 0.97 V and V2 is 0.83 V.

If a difference in voltage |V1−V2| between the average voltages V1 and V2 is obtained, |V1−V2| is 0.02 V when the current Ia flowing through the circuit is small (0.1 A), and 0.14 V when the current Ia flowing through the circuit is large ("|V|" means an absolute value of "V").

Figure 15:
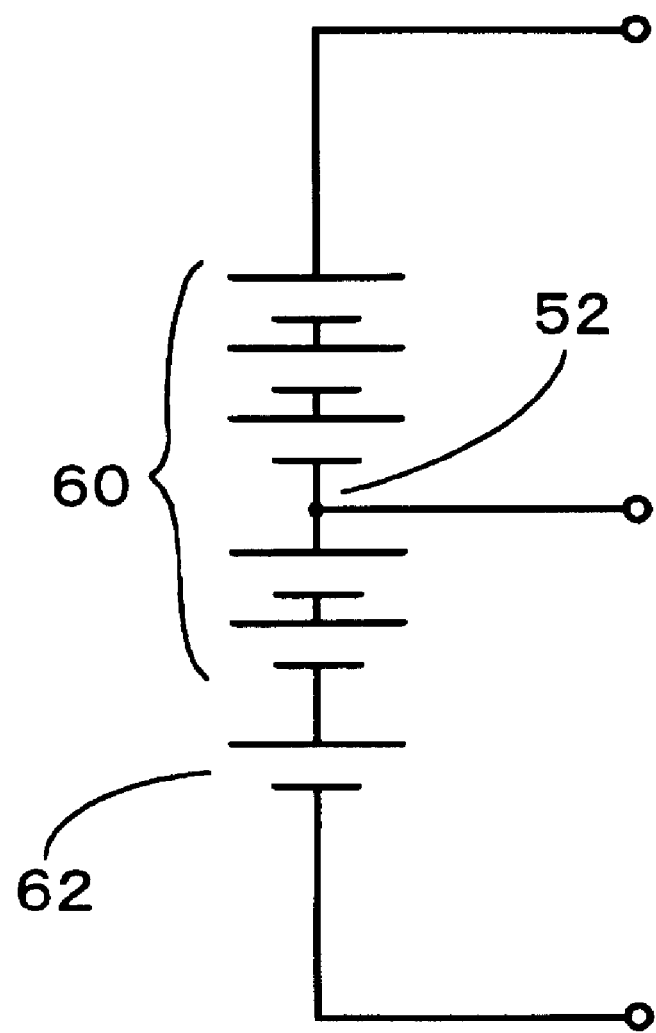
FIG. 15 is a circuit diagram in the vicinity of batteries when an alkaline battery and a manganese battery are mixed.
Figure 16:
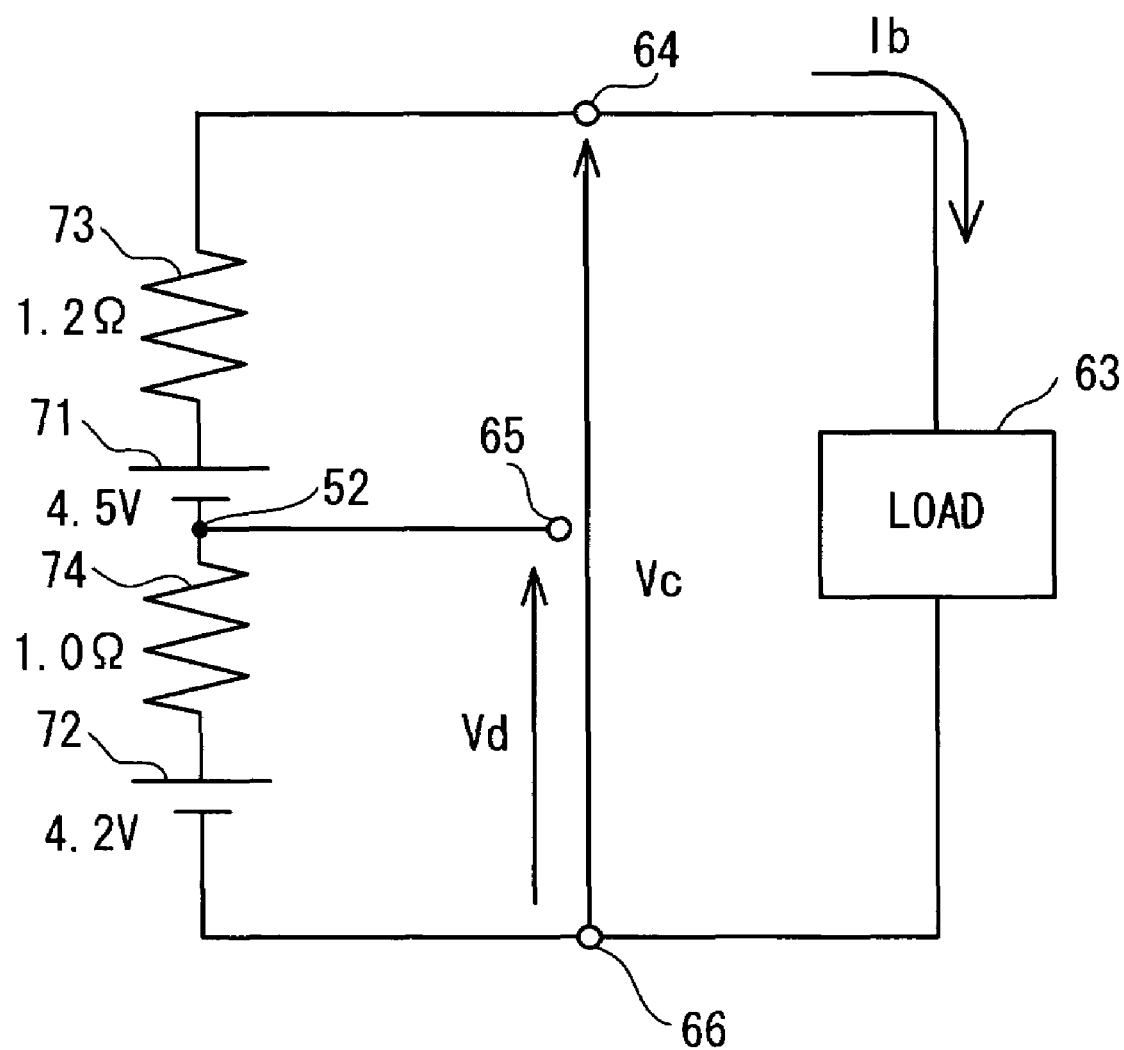
FIG. 16 is a circuit diagram showing a case where an alkaline battery and a Ni-MH battery are mixed.

Next, an example where five alkaline batteries and a Ni-MH battery are mixed in the six batteries connected in series will be described with reference to FIGS. 15-17. FIG. 15 is a circuit diagram of battery connection indicating a case where the alkaline batteries and Ni-MH batteries are mixed. FIG. 16 is a circuit diagram showing a case where the alkaline batteries and Ni-MH batteries are mixed. FIG. 17 is a diagram showing respective voltage values when the alkaline batteries and Ni-MH batteries are mixed.

When five alkaline batteries 60 and a Ni-MH battery 62 are connected in series, as shown in FIG. 15, the voltage of all six batteries, including the alkaline batteries 60 and Ni-MH batteries 62, and the voltage of three batteries on the low voltage side, separated by the connecting point 52, are measured.

The total electromotive force of the three batteries (between points 64 and 65) constituted of only the alkaline batteries 60 is 4.5 V and the total internal resistance is 1.2 Ω. The total electromotive force of the three batteries (between points 65 and 66), including the Ni-MH batteries 62, is 4.2 V and the total internal resistance is 1.0 Ω. Thus, if the above-described power supply is expressed with an equivalent voltage power, it is expressed by the electromotive forces 71, 72 and the internal resistances 73, 74, as shown in FIG. 16.

As shown in FIG. 17, the voltage (voltage between points 64 and 66) Vc of all six batteries, including the alkaline batteries 60 and Ni-MH batteries 62, is 8.48 V when a current Ib flowing through the circuit is small (0.1 A). The voltage (voltage between points 65 and 66) Vd of the three batteries on the low voltage side separated by the connecting point 52 is 4.1 V. If the current Ib flowing through the circuit is large (1.0 A), the Vc is 6.5 V and the Vd is 3.2 V.

If average voltages V1 and V2 per battery at the respective voltages Vc and Vd are calculated, V1 is 1.41 V when the current Ib flowing through a circuit is small (0.1 A) and V2 is 1.37 V. Further, when the current Ib flowing through the circuit is large (1.0 V), V1 is 1.08 V and V2 is 1.07 V.

If a difference in voltage |V1−V2| between the average voltages V1 and V2 is obtained, |V1−V2| is 0.04 V when the current Ib flowing through the circuit is small (0.1 A) and 0.01 V when the current Ib flowing through the circuit is large.

The first A/D input 48 and the second A/D input 49, which are used in this embodiment, can detect about a 0.01V or larger difference of the input voltage. In other words, resolution of the first A/D input 48 and the second A/D input 49, which are used in this embodiment, is about 0.01V.

Accordingly, if a tolerable voltage difference ΔV is set to 0.03 V and when the voltage difference |V1−V2| between the average voltages V1 and V2 exceeds that value, the mixing of different types of batteries is detected. When the current value is low, that is, when a current load applied to the battery is small, it comes that the voltage difference between the averages V1 and V2, |V1−V2| obtained when the alkaline batteries 60 and Ni-MH batteries 62 are mixed is 0.04 V, which is over the tolerable voltage difference ΔV. Thus, the detection of the mixing is enabled.

Further, when the current value is large, that is, when the current load applied to the battery is large, the voltage difference |V1−V2| between the average voltages V1 and V2 obtained when the alkaline batteries 60 and manganese batteries 62 are mixed is 0.14 V, which is over the tolerable voltage difference ΔV. Thus, the detection of the mixing of different types of batteries is enabled.

Therefore, in the battery characteristic detecting processes (S2) prior to print processes, by comparing the voltages of the batteries, mixing of a battery having a different battery characteristic when the current value is low can be detected, namely a battery having a different voltage when a current load applied to the battery is small can be detected. Thus, for example, mixing of the Ni-MH batteries 62 with the alkaline batteries 60 can be detected.

If particularly large characters are printed in printing processes, more current than usually flows to the battery 38, so that the current load applied to the battery 38 increases. Thus, in the battery characteristic detecting processes (S11) during print processes, by comparing the battery voltages, mixing of a battery having a different voltage characteristic when the current value is high can be detected, namely, mixing of a battery having a different voltage when the current load applied to the battery is large can be detected. For example, mixing of the alkaline batteries 60 and manganese batteries 61 can be detected.

Further, if a battery having a different usage time is mixed (for example, if a consumed battery is mixed in unused batteries), a battery having a long usage time lowers its terminal voltage, as compared to a battery having a short usage time when the current load is large. Thus, by comparing the voltages, mixing of a battery having a different usage time can be detected.

Figure 18:
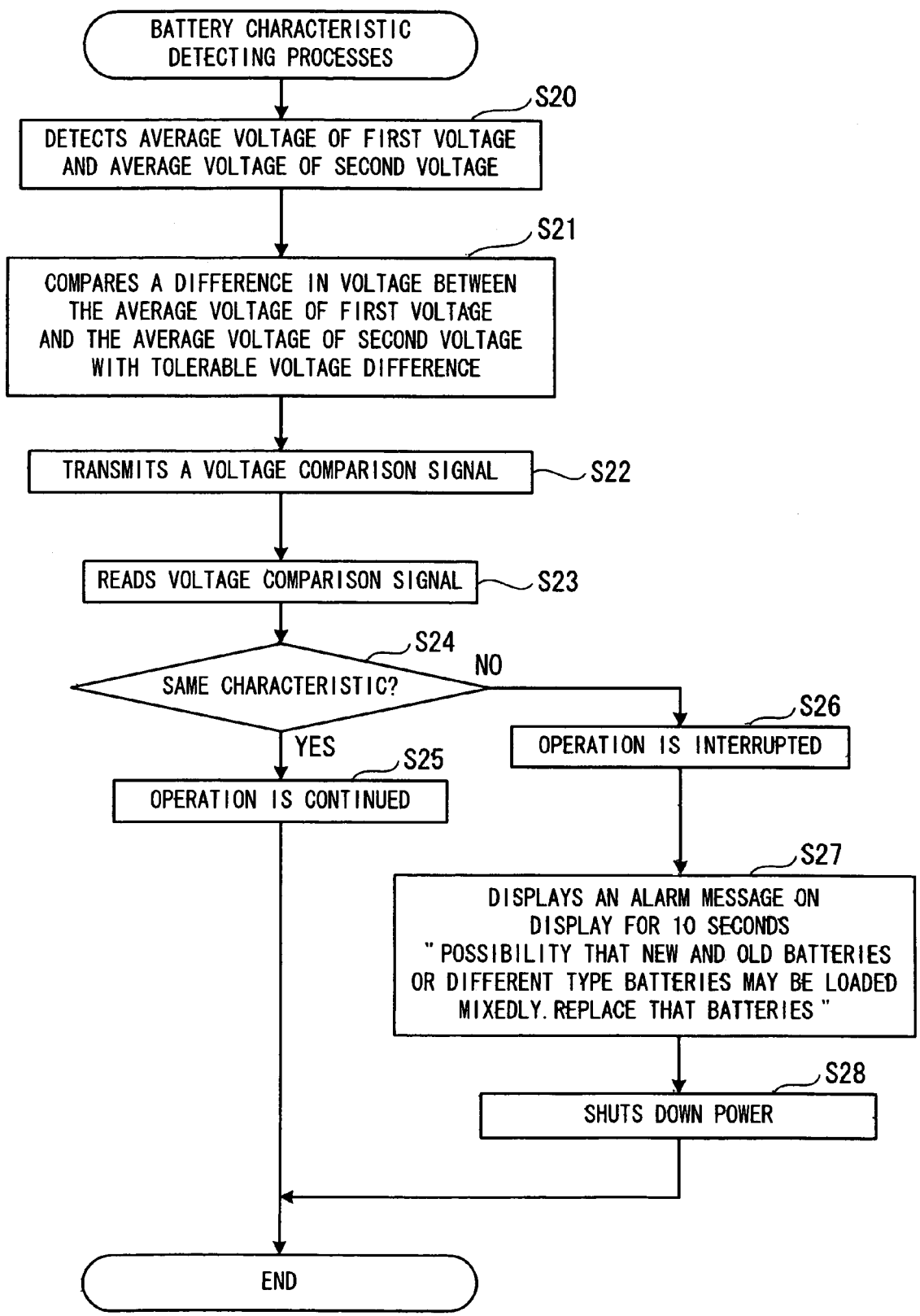
FIG. 18 is a flow chart of battery characteristic detection processing program in the tape printing apparatus of the embodiment.

Subsequently, the battery characteristic detecting processes in the S2 and S11 will be described with reference to FIG. 18. FIG. 18 is a flow chart of a battery characteristic detecting processing program.

First, in S20, the first A/D input 48 detects the average voltage V1 per battery obtained by dividing the first voltage of the all batteries 38 connected in series with the resistors 41, 42. Likewise, the second A/D input 49 detects the average voltage V2 per battery obtained by dividing the second voltage of batteries on the grounding side with respect to any connecting point, and the batteries connected in series, with the resistors 43, 44. The procedure then proceeds to S21.

In S21, the voltage voltage comparator circuit 50 compares the voltage difference |V1−V2| between the average voltage V1 of the first voltage and the average voltage V2 of the second voltage with a predetermined tolerable voltage difference ΔV. As a result, if the voltage difference |V1−V2| is smaller than the tolerable voltage difference ΔV, a voltage comparison signal "0" is dispatched to the CPU 51 and if it is larger than the tolerable voltage difference ΔV, a voltage comparison signal "1" is dispatched to the CPU 51 (S22). Usually, the tolerable voltage difference ΔV is 0.03 V and this value is stored in a nonvolatile memory connected to the CPU 51.

Then, a voltage comparison signal is read by the CPU 51 (S23) and the battery characteristic is determined based on the voltage comparison signal (S24). If the voltage comparison signal outputted from the voltage voltage comparator circuit 50 is "0", it is determined that any battery having a different characteristic is not mixed (S24: YES) and the operation is continued (S25). On the other hand, if the voltage comparison signal outputted from the voltage voltage comparator circuit 50 is "1", it is determined that a battery having a different characteristic is mixed (S24: NO), the supply of power to the load 39 is stopped by turning off the first switch 40 and the current operation is interrupted (S26). After that, an alarm message is displayed on the display 9 for about 10 seconds (S27). The alarm messages to be displayed on the display 9 include, for example, "battery check", "battery error", "battery mixing", "change batteries", and the like.

A more detailed description of the alarm message may be included in the operation manual of the tape producing apparatus 1 or contained in a label or the like and this may be attached to the tape producing apparatus 1.

By turning off the second switch 45 and the third switch 46 after the alarm message is displayed, the power of the tape producing apparatus 1 is shut down completely (S28). Thus, an operator can be notified that a battery having a different characteristic is mixed, and that the power is shut down for safety before the power is shut down, through the liquid crystal display 9.

The invention is not restricted to the above-described embodiments and may be improved or modified in various ways within a scope not departing from the gist of the invention. Although according to this embodiment, the battery characteristic detecting processes are executed prior to key input and during printing, it may be carried out after the print is finished or during activation of a drive motor.

As described above in detail, in the tape producing apparatus 1 of this embodiment, the average voltage V1 per battery of the first voltage of the plural batteries 38 connected in series and the average voltage V2 per battery of the second voltage of the batteries 38 at the connecting point 52 are detected (S20), the voltage difference |V1−V2| between the average voltage V1 and the average voltage ΔV are compared (S21) and if it is determined that a battery 38 having a different characteristic is mixed (S24: NO), the operation is interrupted (S26) and at the same time, the power supply is interrupted (S28). Consequently, an abnormal operation of the tape producing apparatus 1 which may be caused by continuing the usage in a condition that a battery having a different characteristic is mixed in the batteries 38 accommodated in the battery accommodating section 27 and fluid leakage of the batteries 38 are prevented to ensure the safety use. Additionally because the alarm message is displayed on the display before the power is turned off, the operator can be notified that a battery having a different characteristic is mixed in the batteries 38 accommodated in the battery accommodating section 27 and the power is shut down for the safety before the supply of power is shut down.

Further, by executing the determination on the battery characteristic (S24) both when the current load applied on the battery 38 is small and large, respectively, whether or not any battery having a different characteristic in terms of nomination voltage, battery type (for example, manganese battery, alkaline battery), remaining capacity and the like is mixed can be detected.

What is claimed is:

1. An electronic apparatus which is supplied with electric power from a plurality of batteries connected in series, comprising:
   detecting means for detecting a first voltage of a sum of the plurality of batteries connected in series and a second voltage of batteries connected in series at any connecting point between the plurality of batteries; and
   determining means for determining a battery type based on the first voltage and the second voltage;
   wherein the determining means includes:
      first determining means for determining whether primary batteries and secondary batteries are mixed in the plurality of batteries when the current load applied to the plurality of batteries is small; and
      second determining means for determining whether a plurality of types of batteries are mixed in the plurality of batteries when the current load applied to the plurality of batteries is large; and
   wherein the determining means determines a remaining capacity of each of the plurality of batteries.

2. The electronic apparatus according to claim 1, further comprising:
   average voltage acquiring means for acquiring a first average voltage per each of the plurality of batteries from the first voltage detected by the detecting means and a second average voltage per each of the plurality of batteries from the second voltage detected by the detecting means; and
   comparing means for comparing the first average voltage with the second average voltage, wherein the determining means determines a first battery type based on a comparison result by the comparing means.

3. The electronic apparatus according to claim 2, wherein the determining means determines the battery type when a current load applied to the plurality of batteries is small.

4. The electronic apparatus according to claim 2, wherein the determining means determines the battery type when the current load applied to the plurality of batteries is large.

5. The electronic apparatus according to claim 2, wherein the first determining means determines the battery type when the current load applied to the plurality of batteries is small, and the second determining means determines the battery type when the current load applied to the plurality of batteries is large.

6. The electronic apparatus according to claim 2, wherein when the first determining means determines that the primary batteries and secondary batteries are mixed in the plurality of batteries or the second determining means determines that the plurality of types of batteries are mixed in the plurality of batteries, the supply of power from the plurality of batteries is shut down.

7. The electronic apparatus according to claim 6, further comprising:
   a display,
   wherein when the first determining means determines that the primary batteries and secondary batteries are mixed in the plurality of batteries or the second determining means determines that the plurality of types of batteries are mixed in the plurality of batteries, an alarm is provided on the display.

8. The electronic apparatus according to claim 2, further comprising:
   a display,
   wherein when the first determining means determines that the primary batteries and secondary batteries are mixed in the plurality of batteries or the second determining means determines that the plurality of types of batteries are mixed in the plurality of batteries, an alarm is provided on the display.

9. The electronic apparatus according to claim 1, wherein the determining means determines the first battery type when the current load applied to the plurality of batteries is small.

10. The electronic apparatus according to claim 1, wherein the determining means determines the first battery type when the current load applied to the plurality of batteries is large.

11. The electronic apparatus according to claim 1, wherein the first determining means determines the first battery type when the current load applied to the plurality of batteries is small and the second determining means determines the first battery type when the current load applied to the plurality of batteries is large.

12. The electronic apparatus according to claim 1, wherein when the first determining means determines that the primary batteries and secondary batteries are mixed in the plurality of batteries or the second determining means determines that the plurality of types of batteries are mixed in the plurality of batteries, the supply of power from the plurality of batteries is shut down.

13. The electronic apparatus according to claim 12, further comprising:
   a display, wherein when the first determining means determines that the primary batteries and secondary batteries are mixed in the plurality of batteries or the second determining means determines that the plurality of types of batteries are mixed in the plurality of batteries, an alarm is provided on the display.

14. The electronic apparatus according to claim 1, further comprising
a display,
wherein when the first determining means determines that the primary batteries and secondary batteries are mixed in the plurality of batteries or the second determining means determines that the plurality of types of batteries are mixed in the plurality of batteries, an alarm is provided on the display.

15. An electronic apparatus which is supplied with electric power from a plurality of batteries connected in series and driven, comprising:
a voltage detecting circuit that detects a first voltage of a sum of the plurality of batteries connected in series and a second voltage of batteries connected in series at any connecting point between the plurality of batteries; and
a controller that determines a first battery type based on the first voltage and the second voltage,
wherein the controller determines a remaining capacity of each of the plurality of batteries, and
wherein the controller determines whether primary batteries and secondary batteries are mixed in the plurality of batteries when the current load applied to the plurality of batteries is small and further determines whether a plurality of types of batteries are mixed in the plurality of batteries when the current load applied to the plurality of batteries is large.

16. The electronic apparatus according to claim 15, further comprising:
an average voltage acquiring circuit that acquires a first average voltage per each of the plurality of batteries from the first voltage detected by the voltage detecting circuit and a second average voltage per each of the plurality of batteries from the second voltage detected by the voltage detecting circuit;
a voltage comparing circuit that compares the first average voltage with the second average voltage; and
a controller that determines a second battery type based on a comparison result by the voltage comparing circuit.

17. The electronic apparatus according to claim 16, wherein the controller determines at least one of the first battery type and the second battery type when the current load applied to the plurality of batteries is small.

18. The electronic apparatus according to claim 16, wherein the controller determines at least one of the first battery type and the second battery type when the current load applied to the plurality of batteries is large.

19. The electronic apparatus according to claim 16, wherein the controller determines at least one of the first battery type and the second battery type when the current load applied to the plurality of batteries is small and further determines at least one of the first battery type and the second battery type when the current load applied to the plurality of batteries is large.

20. The electronic apparatus according to claim 16, wherein when the controller determines that the primary batteries and the secondary batteries are mixed in the plurality of batteries or the plurality of types of batteries are mixed in the plurality of batteries, the supply of power from the plurality of batteries is shut down.

21. The electronic apparatus according to claim 20, further comprising:
a display,
wherein when the controller determines that the primary batteries and the secondary batteries are mixed in the plurality of batteries or the plurality of types of batteries are mixed in the plurality of batteries, an alarm is provided on the display.

22. The electronic apparatus according to claim 16, further comprising:
a display,
wherein when the controller determines that the primary batteries and the secondary batteries are mixed in the plurality of batteries or the plurality of types of batteries are mixed in the plurality of batteries, an alarm is provided on the display.

23. The electronic apparatus according to claim 15, wherein the controller determines the first battery type when the current load applied to the plurality of batteries is small.

24. The electronic apparatus according to claim 15, wherein the controller determines the first battery type of the plurality of batteries when the current load applied to the plurality of batteries is large.

25. The electronic apparatus according to claim 15, wherein the controller determines the first battery type when the current load applied to the plurality of batteries is small and further determines the first battery type when the current load applied to the plurality of batteries is large.

26. The electronic apparatus according to claim 15, wherein when the controller determines that the primary batteries and the secondary batteries are mixed in the plurality of batteries or the plurality of types of batteries are mixed in the plurality of batteries, the supply of power from the plurality of batteries is shut down.

27. The electronic apparatus according to claim 26, further comprising:
a display,
wherein when the controller determines that the primary batteries and the secondary batteries are mixed in the plurality of batteries or the plurality of types of batteries are mixed in the plurality of batteries, an alarm is provided on the display.

28. The electronic apparatus according to claim 15, further comprising:
a display,
wherein when the controller determines that the primary batteries and the secondary batteries are mixed in the plurality of batteries or the plurality of types of batteries are mixed in the plurality of batteries, an alarm is provided on the display.

29. A method for controlling an electronic apparatus which is supplied with electric power from a plurality of batteries connected in series, comprising:
detecting a first voltage of a sum of the plurality of batteries connected in series;
detecting a second voltage of a plurality of batteries connected in series at any connecting point between the plurality of batteries;
determining a battery type based on the first voltage and the second voltage;
determining whether primary batteries and secondary batteries are mixed in the plurality of batteries when the current load applied to the plurality of batteries is small; and
determining whether a plurality of types of batteries are mixed in the plurality of batteries when the current load applied to the plurality of batteries is large,
wherein the determining the battery type includes determining means includes determining a remaining capacity of each of the plurality of batteries.

30. The method for controlling an electronic apparatus according to claim 29, further comprising determining the battery type when a current load applied to the plurality of batteries is small.

31. The method for controlling an electronic apparatus according to claim 29, further comprising determining the battery type when the current load applied to the plurality of batteries is large.

32. The method for controlling an electronic apparatus according to claim 29, further comprising:
   determining the battery type when the current load applied to the plurality of batteries is small; and
   determining the battery type when the current load applied to the plurality of batteries is large.

33. The method for controlling an electronic apparatus according to claim 29, further comprising terminating the supply of power from the plurality of batteries when it is determined that the primary batteries and secondary batteries are mixed in the plurality of batteries or a plurality of types of batteries are mixed in the plurality of batteries.

34. The method for controlling an electronic apparatus according to claim 33, further comprising providing an alarm on a display when it is determined that the primary batteries and the secondary batteries are mixed in the plurality of batteries or the plurality of types of batteries are mixed in the plurality of batteries.

35. The method for controlling electronic apparatus according to claim 29, further comprising providing an alarm on a display when it is determined that the primary batteries and secondary batteries are mixed in the plurality of batteries or the plurality of types of batteries are mixed in the plurality of batteries.

* * * * *